INVENTORS
David H. Ransom
BY Fred Benjamin
ATTORNEY

July 28, 1953 D. H. RANSOM ET AL 2,647,232
POWER CONTROLLED SWITCH FOR ELECTRIC MOTORS
Filed Jan. 17, 1951 2 Sheets-Sheet 2

INVENTORS
David H. Ransom
Fred Benjamin
BY
ATTORNEY

Patented July 28, 1953

2,647,232

UNITED STATES PATENT OFFICE 2,647,232

POWER CONTROLLED SWITCH FOR ELECTRIC MOTORS

David H. Ransom, Pines Lake, and Fred Benjamin, Fair Lawn, N. J., assignors to Bogue Electric Manufacturing Co., Paterson, N. J.

Application January 17, 1951, Serial No. 206,353

6 Claims. (Cl. 318—455)

This invention relates to power control systems. More particularly, the invention concerns an electrical system for sensing changes in current flowing in a load circuit and being operative to protect the load against injurious effects resulting from such current changes.

In the case of motor operated tools, dies and the like, any overload may result in injury to the tool, die or the like, unless provision is made for quickly disconnecting the tool or die from its operating means. While various devices and systems have been suggested for such purposes, including electronic tube circuits, such systems involve problems of maintenance, replacement of parts, undue sensitivity to vibration, complexity of parts and circuits, bulk and the like.

Accordingly, an object of this invention is to provide an improved power control system which is of relatively simple construction, includes a minimum number of parts, has a high degree of sensitivity to power or current changes, requires no maintenance or replacement of parts, is insensitive to vibration, occupies a minimum amount of space and exhibits stability in operation throughout its life.

Another object of this invention is to provide a system of the character described which includes a saturable reactor adapted to sense small current changes and responsive to such current changes to protect a load either through electrical or mechanical means.

A further object of this invention is to provide a system of the character described which includes a saturable reactor adapted to sense slight power changes while compensating for voltage fluctuations and operative to protect a load against injurious effects of such power changes.

Another object of this invention is to provide a load protecting system which may be used with alternating or direct current motors and operative to protect such motors or their functions from the injurious effects of small increases of power.

Still another object of this invention is to provide a system of the character described, which is adapted to become operative in response to small changes in power in the system, such system being self restoring upon restoration of the normal power conditions in the system.

Another objects of this invention will in part be obvious and in part hereinafter pointed out.

The invention accordingly consists in the combination of elements and interconnection of parts, which will be exemplified in the system hereinafter described, and of which the scope of invention will be indicated in the following claims.

Figure 1:
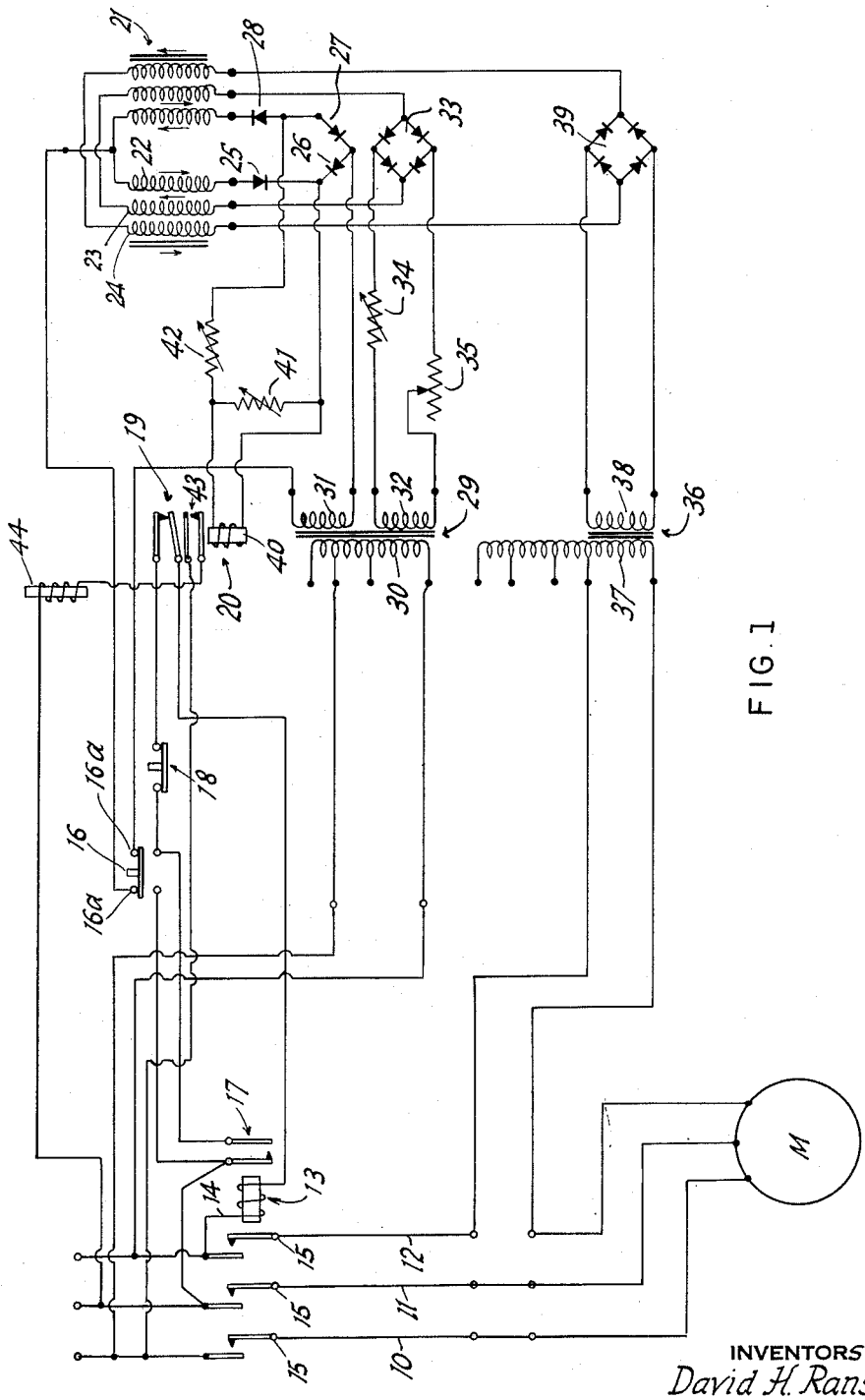
Fig. 1 is a circuit diagram of a power control system embodying the invention.

Referring in detail to the drawing and particularly to Fig. 1, M designates an electric motor which may operate a punch press, machine tool or other power actuated mechanism. The motor M is energized by means of power leads 10, 11, 12 of an alternating current source. The motor M is started by the use of a start-stop relay 13 whose winding 14 is connected across leads 11, 12 and is adapted to close the line switch contacts 15 in response to operation of the double throw button switch 16.

The operation of relay 13 is also effective to close the line holding switch contacts 17, allowing the motor circuit to remain closed when the switch button 16 is released. A single throw button switch 18 in normally closed position, is interposed in the circuit including contacts 17 and is manually operable to open the relay circuit and disconnect the motor from the current source.

Switch means 19 operable by a relay 20, is connected in series with switch 18. The relay 20 is connected in circuit with a saturable reactor 21, which is adapted to sense small deviations from the normal current or power supplied to the motor M and responsive to such deviations, to supply an amplified current for operating the relay 20.

The reactor 21 comprises two suitable magnet cores on which are wound a pair of parallel connected power windings 22, a pair of series connected bias windings 23, and a pair of series connected control windings 24. A plurality of series connected rectifiers 25, 26, 27 and 28, are connected in circuit with the power windings 22.

A transformer 29 has its primary winding 30 connected across power leads 10, 12 and a secondary winding 31 connected on one side, to the juncture of windings 22 and on the other side, to the juncture of rectifiers 26, 27. The normally closed contacts 16a of switch 16 are interposed in the conductor extending from the transformer winding 31 to the juncture of power windings 22.

Another secondary winding 32 on transformer 29 supplies current to the bias windings 23 through the rectifier 33. Adjustable resistors 34, 35 are inserted in the respective leads from the transformer winding 32.

A current transformer 36 has its primary winding 37 inserted in the power lead 12, the secondary winding 38 being connected to the control windings 24 through rectifier 39. The windings 22, 23 and 24 are poled and energized in a manner to provide fluxes having the same direction in the case of the power windings 22 and control windings 24, and both in opposition to that of the bias windings 23, as indicated by arrows in Fig. 1.

The winding 40 of relay 20 is in circuit with the output side of the power windings 22, being connected between the juncture of rectifiers 25, 26 and 27, 28. A resistor 41 is shunt connected across winding 40 and a resistor 42 is series connected to the winding.

A pair of contacts 43 on relay 20 are connected to power leads 10, 11, through a winding on solenoid 44, for the purpose hereinafter appearing.

In operating the system, the motor M is started by pressing button switch 16 to energize relay 13, thereby closing the line contacts 15 and the holding contacts 17. The operation of switch 16 is effective to disconnect the reactor 21 from the power circuit momentarily, through opening the contacts 16a, or similar means.

The motor M continues its normal operation unless stopped by manual operation of switch 18 or by the automatic action of the control circuit through reactor 21. The reactor 21, through suitable adjustment of resistors 34, 35, is adapted to be inoperative when normal current or power conditions exist in the motor circuit. However, a slight increase in such current or power will render reactor 21 operative. Such current or power increases may be caused by mechanical overload which can prove to be injurious to tools, dies or the like which may be connected to the motor, unless the motor is quickly deenergized and/or mechanically braked.

With an increase in current above normal or a predetermined value, the control windings 24 are effective to change the degree of saturation of the reactor sufficiently to cause an amplified current to flow in the power windings 22 and to energize the relay 20. The energized relay 20 opens the normally closed contacts of switch means 19, thus opening the motor circuit. Furthermore, the operation of relay 20 may be effective to close a circuit through switch contact 43, to energize solenoid 44 which may operate a clutch or brake, not shown, operatively associated with motor, to disconnect the tool, die, or the like, from the motor.

In this manner, the motor M may be mechanically disconnected from a tool or die before the same is injured, as well as effecting a rapid disconnection of the motor from the current source. Such protective means may be operated together or separately. Additional switch contacts may be provided for operation by relay 20 whereby circuits including signal lights or other warning devices, are closed.

It is apparent, that as soon as power or current conditions are restored to normal, the relay 20 will be deenergized since the reactor 21 will be inoperative under such conditions. Accordingly, the system will automatically restore itself to normal operating conditions without the need for manually or otherwise resetting the control portion of the system.

The sensitivity and response of the control portion of the system may be adjusted by suitably regulating the resistors 34, 35 to provide a selected input to the bias windings 23. Adjustment of the resistors 41, 42 will control the response of relay 20 to a given load.

Figure 2:
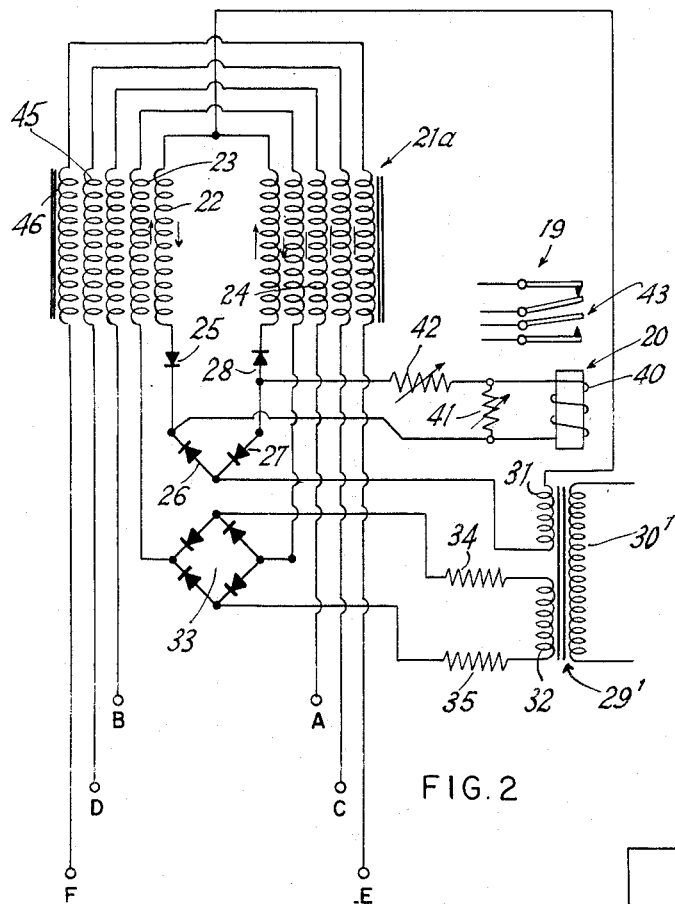
Fig. 2 is a circuit diagram of the control portion of the system, illustrating a modification thereof.
Figure 3:
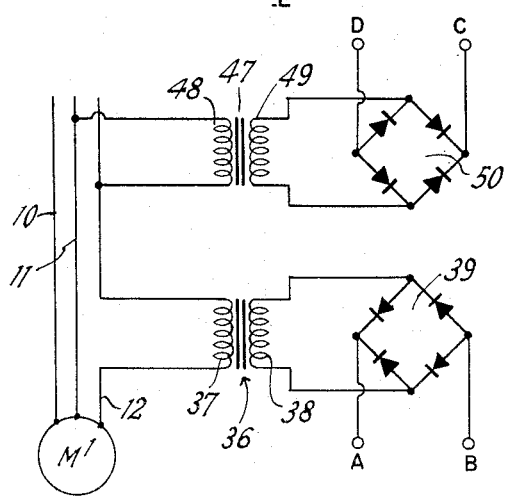
Figs. 3, 4, and 5 are circuit diagrams of different types of motors adapted to be used in conjunction with the control circuit shown in Fig. 2.
Figure 5:
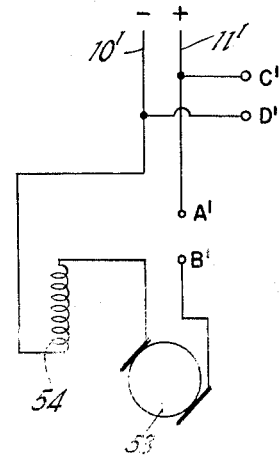
Figure 4:
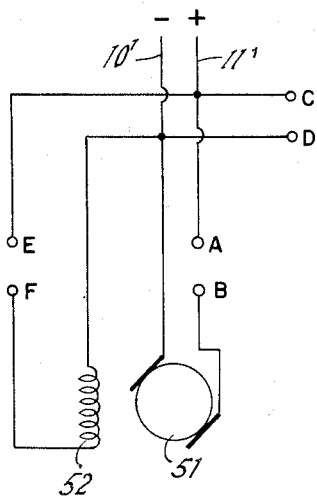

In Fig. 2 is shown a control circuit which takes into account fluctuations in line voltage and may be selectively connected to any one of the alternating or direct current motor circuits shown in Figs. 3, 4 or 5, to protect the same.

The circuit includes a reactor 21a, similar to that previously described and further including a pair of series connected voltage compensation windings 45 and a pair of series connected shunt field compensation windings 46. These windings are also disposed on the magnetic cores, as previously described.

The circuit shown in Fig. 2 is effective with respect to the various motor circuits despite fluctuations in the line voltage. Such voltage fluctuation, within limits, is compensated within reactor 21a, since the voltage compensation windings are poled to provide a flux in the same direction as that of the control windings 22, as indicated by the arrows in the figure. A drop in the motor voltage will require an increase in current for the same load. Such current increase, which passes through the control windings, will be substantially neutralized in effect by the decrease in output to the voltage compensating winding. An increase in motor voltage will be effective to reverse the conditions so as to again provide proper compensation.

The output of the power windings 22 is supplied to the winding 40 of relay 20, as previously described. A constant voltage transformer 29' has its primary winding 30' energized by any suitable alternatng current source. The secondary windings 31, 32 are connected to the power windings 22 and bias windings 23, respectively, as previously described.

The control windings 24 are provided with terminals A, B; the voltage compensation windings 45 with terminals C, D; and the shunt field compensation windings 46 with terminals E, F.

The alternating current motor M', as shown in Fig. 3 is energized through power leads 10, 11, 12, with transformer 36 connected in the lead 12 to provide sensing current for the rectifier 39, as previously described. The output of rectifier 39 is connected to terminals A, B, which are adapted to be connected to the corresponding terminals A, B of the control circuit shown in Fig. 2.

Voltage fluctuations are compensated by means of a circuit including a transformer 47 whose primary winding 48 is connected across power leads 11, 12 and whose secondary winding 49 is connected to the input side of a rectifier 50. The output side of rectifier 50 has terminals C, D, which are adapted to be connected to the corresponding terminals C, D of the voltage compensation winding 45 of the reactor shown in Fig. 2.

Direct current motors may also be protected by the system embodying the invention, as shown in Figs. 4 and 5. In Fig. 4, a shunt field motor 51 is connected to direct current power leads 10', 11' and its field winding 52 is shunted across the power leads. Terminals E, F are inserted in one of the conductors leading the field winding. Terminals C, D are connected to the power leads 11', 10', respectively and terminals A, B, are inserted in the lead 11'.

Upon connecting the respective pairs of terminals of motor 51 to the corresponding terminals of the control circuit shown in Fig. 2, overload of the motor 51 which causes even a slight change in current or power conditions will cause the reactor 21a to become operative to actuate relay 20 and switch 19, in the manner previously described. Fluctuations in the armature and field voltages of the motor will be compensated within the reactor through the windings 45, 46, respectively, as previously described.

In Fig. 5, a direct current motor 53 with a series field winding 54, is connected to power leads 10', 11'. Terminals A', B' are inserted in the lead 11', for connection to terminals A, B, respectively of the control circuit shown in Fig. 2, while terminals C', D', are connected to leads 11', 10', respectively, for connection to terminals C, D of the control circuit. Here, the current and voltage of the motor is directly sensed and supplied to the control and voltage compensation windings respectfully, of the reactor 21a.

It is understood that the constant voltage transformer 29', shown in Fig. 2, may be replaced by a constant current source for supply to windings 23 of reactor 21a. In this case, the input leads to power windings 22 may be directly connected to a suitable voltage source as power lines 10, 11, which are subject to the usual line voltage fluctuations.

It will thus be seen that there is provided a power control system in which the several objects of the invention are achieved and which is well adapted to meet the conditions of practical use.

As various possible embodiments might be made of the above described invention, and as various changes might be made in the embodiments set forth, it is understood that all matter herein set forth or shown in the accompanying drawing, is to be interpreted as illustrative and not in a limiting sense.

Having thus described our invention, we claim as new and desire to protect by Letters Patent:

1. In combination, a motor, a source of current for energizing said motor, reactor means including a power winding, a control winding, and a line voltage compensating winding in circuit with said current source switch means between said motor and said current source and electrically operable means for actuating said switch means in circuit with said power winding, said control winding being connected in circuit with said motor and responsive to small changes in power in said motor circuit to allow said power winding to energize said switch actuating means and said last mentioned compensating winding being operative to render said power winding inoperative upon fluctuations in line voltage with the power remaining constant.

2. A control circuit for a motor comprising a reactor having a plurality of windings, switch means and a relay for actuating said switch means, one of said windings being in circuit with said relay, another of said windings being adapted to sense the current values in the motor circuit, and a third winding for sensing line voltage fluctuations, said second and third windings being poled to provide fluxes in the same direction whereby to allow operation of said relay in response to an increase in power and to prevent operation of said relay with a change in line voltage, the power remaining constant.

3. In combination, a motor, a source of current for energizing said motor, reactor means including a plurality of windings, electrically operated means for disconnecting a load from said motor under predetermined power conditions in circuit with one of said windings, circuit means connecting a second winding to said current source to sense a small change in power conditions, and a circuit means for connecting a third winding to said current source for sensing line voltage fluctuations, said second and third mentioned windings being arranged to compensate for said line voltage fluctuations within said reactor means, said first mentioned winding being responsive to said predetermined power conditions to energize said electrically operated means.

4. In combination, an alternating current motor, a source of alternating current for energizing said motor, a relay operated switch between said motor and said current source, reactor means including a power winding in circuit with said relay operated switch, a bias winding, a line voltage compensating winding in circuit with said current source and a control winding in circuit with said current source and said motor, means for energizing said bias winding, said control winding being adapted in response to changes in power conditions to cause said power winding to energize said relay operated switch, said compensating winding being operative to prevent operation of said switch upon fluctuations in line voltage, the power remaining constant, said bias winding being adapted to control the operation of said power winding.

5. In combination, a direct current motor, a source of direct current for energizing said motor, electrically operated means for disconnecting a load from said motor under predetermined power conditions, reactor means including a power winding in circuit with said electrically operated means, a control winding in circuit with said motor and current source for controlling the operation of said power winding and a line voltage compensating winding in circuit with said current source.

6. The combination as in claim 5 wherein said motor includes a shunt field winding and said reactor means includes a winding in circuit with said field winding for compensating for voltage fluctuations in said field winding.

DAVID H. RANSOM.
FRED BENJAMIN.

References Cited in the file of this patent
UNITED STATES PATENTS

| Number | Name | Date |
|---|---|---|
| 1,715,684 | Thomas | June 4, 1929 |
| 1,721,409 | Pohl | July 16, 1929 |
| 2,201,829 | Heinrich | May 21, 1940 |